United States Patent
Oh

(10) Patent No.: US 11,629,963 B2
(45) Date of Patent: Apr. 18, 2023

(54) EFFICIENT MAP MATCHING METHOD FOR AUTONOMOUS DRIVING AND APPARATUS THEREOF

(71) Applicant: ThorDrive, Inc., Mountain View, CA (US)

(72) Inventor: Gyumin Oh, Seoul (KR)

(73) Assignee: ThorDrive, Inc., Mountain View, CA (US)

( * ) Notice: Subject to any disclaimer, the term of this patent is extended or adjusted under 35 U.S.C. 154(b) by 451 days.

(21) Appl. No.: 16/830,867

(22) Filed: Mar. 26, 2020

(65) Prior Publication Data
US 2021/0180961 A1      Jun. 17, 2021

(30) Foreign Application Priority Data
Dec. 13, 2019   (KR) ................. 10-2019-0166900

(51) Int. Cl.
  *G01C 21/32* (2006.01)
  *G01C 21/00* (2006.01)
  (Continued)

(52) U.S. Cl.
  CPC ........... *G01C 21/32* (2013.01); *G01C 21/005* (2013.01); *G05D 1/0214* (2013.01);
  (Continued)

(58) Field of Classification Search
  CPC ...... G01C 21/32; G01C 21/005; G01C 21/30; G05D 1/0214; G05D 1/0251; G05D 1/0274; G05D 2201/0213; G06V 20/58; G06V 20/56; B60W 30/14; B60W 2050/0026; B60W 2554/00; G06T 17/05
  See application file for complete search history.

(56) References Cited

U.S. PATENT DOCUMENTS

| | | |
|---|---|---|
| 9,255,805 B1 | 2/2016 | Ferguson et al. |
| 10,203,696 B2 | 2/2019 | Ferguson et al. |
| (Continued) | | |

FOREIGN PATENT DOCUMENTS

| | | |
|---|---|---|
| JP | 2018084573 A | 5/2018 |
| JP | 2019207220 A | 12/2019 |
| (Continued) | | |

OTHER PUBLICATIONS

Suzuki, Taro, Mitsunori Kitamura, Yoshiharu Amano, and Takumi Hashizume, "6-DOF Localization for a Mobile Robot using Outdoor 3D Voxel Maps." In 2010 IEEE/RSJ International Conference on Intelligent Robots and Systems, IEEE, 2010, pp. 5737-5743.
(Continued)

*Primary Examiner* — Nga X Nguyen
(74) *Attorney, Agent, or Firm* — K&L Gates LLP

(57) ABSTRACT

A map matching method for autonomous driving includes extracting a first statistical map from 3D points contained in 3D map data; extracting a second statistical map from 3D points of surroundings which are obtained by a detection sensor simultaneously or after the previous extracting of the statistical map; dividing the second statistical map into a vertical-object part and a horizontal-object part; and performing map matching using the horizontal-object part and/or the vertical-object part and the first statistical map.

22 Claims, 5 Drawing Sheets

(51) Int. Cl.
G05D 1/02 (2020.01)
G06K 9/00 (2022.01)
G06V 20/58 (2022.01)

(52) U.S. Cl.
CPC ......... *G05D 1/0251* (2013.01); *G05D 1/0274* (2013.01); *G06V 20/58* (2022.01); *G05D 2201/0213* (2013.01)

(56) References Cited

U.S. PATENT DOCUMENTS

| | | | | |
|---|---|---|---|---|
| 2019/0080467 | A1* | 3/2019 | Hirzer | G06T 7/73 |
| 2019/0213896 | A1* | 7/2019 | Gohl | G06V 30/194 |
| 2019/0266772 | A1* | 8/2019 | Li | G06T 3/40 |
| 2021/0117704 | A1* | 4/2021 | Yao | G06K 9/6218 |

FOREIGN PATENT DOCUMENTS

| | | |
|---|---|---|
| KR | 101060575 B1 | 8/2011 |
| KR | 101979374 B1 | 5/2019 |
| KR | 102009025 B1 | 8/2019 |

OTHER PUBLICATIONS

Yang, Bisheng, Lina Fang, Qingquan Li, and Jonathan Li, "Automated Extraction of Road Markings from Mobile LiDAR Point Clouds." Photogrammetric Engineering & Remote Sensing 78, No. 4 (2012), pp. 331-338.

Moosmann, Frank, and Christoph Stiller, "Joint Self-Localization and Tracking of Generic Objects in 3D Range Data." In 2013 IEEE International Conference on Robotics and Automation (ICRA), IEEE, 2013, pp. 1138-1144.

Będkowski, Janusz, Andrzej Maslowski, and Geert De Cubber, "Real time 3D localization and mapping for USAR robotic application." Industrial Robot: An International Journal (2012), vol. 39 Iss: 5, pp. 464-474.

Senlet, Turgay, and Ahmed Elgammal, "A Framework for Global Vehicle Localization Using Stereo Images and Satellite and Road Maps." In 2011 IEEE International Conference on Computer Vision Workshops (ICCV Workshops), IEEE, 2011, 8 pages.

Xu, Yuquan, Vijay John, Seiichi Mita, Hossein Tehrani, Kazuhisa Ishimaru, and Sakiko Nishino, "3D Point Cloud Map Based Vehicle Localization Using Stereo Camera." In 2017 IEEE Intelligent Vehicles Symposium (IV), IEEE, 2017, 7 pages.

Biber, Peter, and Wolfgang Straßer, "The Normal Distributions Transform: A New Approach to Laser Scan Matching." In Proceedings 2003 IEEE/RSJ International Conference on Intelligent Robots and Systems (IROS 2003)(Cat. No. 03CH37453), vol. 3, IEEE, 2003, 7 pages.

Martin, Fernando, Rudolph Triebel, Luis Moreno, and Roland Siegwart, "Two different tools for three-dimensional mapping: DE-based scan matching and feature-based loop detection." Robotica 32, No. 1 (2014): 19-41, pp. 1-24.

Irie, Kiyoshi, Tomoaki Yoshida, and Masahiro Tomono, "Outdoor Localization Using Stereo Vision Under Various Illumination Conditions." Advanced Robotics 26, No. 3-4 (2012): 327-348, 24 pages.

Litomisky, Krystof, and Bir Bhanu, "Removing Moving Objects from Point Cloud Scenes." In International Workshop on Depth Image Analysis and Applications, Springer, Berlin, Heidelberg, 2012, pp. 1-10.

Shan, Tixiao, and Brendan Englot, "Lego-loam: Lightweight and Ground-Optimized Lidar Odometry and Mapping on Variable Terrain." In 2018 IEEE/RSJ International Conference on Intelligent Robots and Systems (IROS), IEEE, 2018, 3 pages.

Menze, Moritz, and Andreas Geiger, "Object Scene Flow for Autonomous Vehicles." In Proceedings of the IEEE conference on computer vision and pattern recognition, 2015, pp. 3061-3070.

Huang, Xinyu, Xinjing Cheng, Qichuan Geng, Binbin Cao, Dingfu Zhou, Peng Wang, Yuanqing Lin, and Ruigang Yang, "The Apolloscape Dataset for Autonomous Driving." In Proceedings of the IEEE Conference on Computer Vision and Pattern Recognition Workshops, 2018, pp. 1067-1073.

* cited by examiner (a)

(mean, variance)

(b)

(a)

(b)

(c)

EFFICIENT MAP MATCHING METHOD FOR AUTONOMOUS DRIVING AND APPARATUS THEREOF

PRIORITY STATEMENT

This application claims priority under 35 U.S.C. § 119 to Korean Patent Application No. 10-2019-0166900, filed on Dec. 13, 2019 in the Korean Intellectual Property Office (KIPO), the contents of which are herein incorporated by reference in their entirety.

FIELD OF TECHNOLOGY

The present disclosure relates to a map matching method for autonomous driving and an apparatus thereof, and more specifically, to a method for estimating a pose of an autonomous driving apparatus by comparing 3D data of surroundings that is input from a detection sensor with 3D map data stored in advance, and the apparatus thereof.

BACKGROUND

Autonomous driving is a technique in which an autonomous driving apparatus itself recognizes a driving environment by using a sensor, autonomously operates a drive system, and performs autonomous driving to a target point without an operation performed by a driver.

The autonomous driving apparatus basically needs to recognize its position in a driving environment for autonomous driving.

In order to perform such recognition, 3D data of surroundings recognized by a detection sensor installed on the autonomous driving apparatus is compared with 3D map data stored in advance, and pose estimation or localization of the autonomous driving apparatus is performed within a 3D map. Here, this process is referred to as map matching. The autonomous driving is performed based on the pose of the autonomous driving apparatus, and thus there is a demand for a map matching technique which is performed in real time with high accuracy.

As one map matching method, features of a tree, a building, a road, and the like which can be used as a landmark are extracted in advance in 3D data of surroundings recognized by a detection sensor such that an extracted feature part can be compared with a corresponding part on a 3D map; however, this method has a disadvantage in that an amount of processing increases in a process of extracting the features from the detected 3D data.

As another map matching method, reflectivity of a measurement surface is used in map matching, the reflectivity being obtained by a light detection and ranging (LiDAR) sensor as a detection sensor which measures a feature of a return signal reflected after a target object is irradiated with an optical pulse. However, the reflectivity of the surface in an external environment such as a road is a feature that significantly changes depending on weather such as rain or snow, and thus the map matching method has a problem of a change in accuracy depending on weather.

In general, a pose of an autonomous driving apparatus can be identified in map matching by comparing a 3D structure recognized by a detection sensor with 3D map data. Pose identification using the 3D structure can be performed with consideration for 3D spatial coordinates (for example, x, y, and z in a case of using an orthogonal coordinate system) representing the pose of the autonomous driving apparatus and 3D rotation angles (roll, pitch, and yaw) representing an attitude of the autonomous driving apparatus. This is referred to as six-degree-of-freedom (DOF) pose estimation. In this case, the amount of processing is proportional to a search space to the sixth power for each degree of freedom, and thus the estimation has a drawback of a long processing time. In order to solve the drawback, a method for obtaining only some of the six degrees of freedom (for example, three degrees of freedom) by using the map matching and estimating the remaining degrees of freedom by a motion sensor or the like can be employed; however, this method has a drawback in that a pose error occurs. Consequently, there is a demand for a new map matching method by which it is possible to minimize a pose error of an autonomous driving apparatus while the amount of processing for map matching is reduced.

In addition, whereas items of 3D map data used in map matching indicate static elements of surrounding environments of an autonomous driving apparatus, a detection sensor recognizes, in a real driving environment, a temporary object such as a passerby, a car, or a temporarily installed object that is not reflected in the 3D map data, and thus accuracy of the map matching is lowered when 3D surrounding data containing the temporary object is compared with the 3D map data. In order to solve such a problem, there is a demand for a new map matching method that includes a process for removing a part corresponding to the temporary object in advance from the 3D surrounding data recognized by the detection sensor.

Consequently, there is a demand for a new map matching method for removing a temporary object in advance from 3D surrounding data obtained by a detection sensor in order to improve accuracy of the map matching and for performing processing in real time while minimizing a pose error in the map matching for autonomous driving, and the present disclosure is provided with consideration for the demand.

SUMMARY

An object of the present disclosure is to provide a new map matching method for optimizing an amount of processing such that processing can be performed in real time while a pose error of an autonomous driving apparatus is minimized.

In addition, another object of the present disclosure is to provide an efficient method for recognizing and removing a temporary object from 3D surrounding data recognized by a detection sensor of an autonomous driving apparatus in order to estimate a pose of the autonomous driving apparatus with accuracy.

In order to achieve the technical object described above, a map matching method for autonomous driving according to an embodiment of the present disclosure includes: extracting a first statistical map from 3D points of 3D map data; extracting a second statistical map from 3D points obtained by a detection sensor of the autonomous driving apparatus simultaneously with or after the previous extraction of the first statistical map; dividing the second statistical map into a vertical-object part and a horizontal-object part; and estimating a pose od the autonomous driving apparatus by comparing the horizontal-object part and/or the vertical-object part and the first statistical map.

According to an embodiment of the present disclosure, in the statistical map, a 3D space may be divided in accordance with a predetermined rule, and one or more statistical values of 3D points contained in a divided region represent the 3D points in the divided region.

According to an embodiment of the present disclosure, in the statistical map, a 3D space may be divided with respect to a 2D plane, and one of more statistical values of the remaining dimension of 3D points contained in the divided region may be calculated and represented on the 2D plane.

According to an embodiment of the present disclosure, in the statistical map, an (x, y) plane may be divided into evenly spaced grids in the Cartesian coordinate system to represent one or more statistical values of height z values of 3D points corresponding to the respective grids.

According to an embodiment of the present disclosure, in the statistical map, statistical values of height z values may be represented in corresponding regions formed by dividing r and θ of an (r, θ) plane evenly in the cylindrical coordinate system.

According to an embodiment of the present disclosure, in the statistical map, statistical values of respective θ values of 3D points may be represented in corresponding regions formed by dividing r and φ of an (r, φ) plane evenly in the spherical coordinate system.

According to an embodiment of the present disclosure, the statistical map may represent one or more statistical values of a mean, a mode, a maximum, a median, a minimum, a range, an interquartile range, a quartile deviation, a variance, a standard deviation, a coefficient of variation, and a covariance.

According to an embodiment of the present disclosure, whether 3D points contained in one of the divided regions are divided into two or more groups in the statistical map may be detected.

According to an embodiment of the present disclosure, when the two or more separated groups of 3D points are detected in a divided region in the statistical map, the divided region may be divided again such that each one of divided region contains one group of 3D points only.

According to an embodiment of the present disclosure, when the number of 3D points contained in one of the two or more groups contained in one of the divided regions is equal to or smaller than a predetermined value, the 3D points contained in the group may be deleted.

According to an embodiment of the present disclosure, detecting whether the 3D points contained in each divided region are separated into two or more groups may be forming groups by grouping 3D points positioned within a predetermined distance and checking whether the two or more groups that are separated from each other by a distance more than the predetermined length are formed.

According to an embodiment of the present disclosure, the second statistical map may be divided into the vertical-object part and the horizontal-object part depending on statistical values of the respective divided regions of the second statistical map.

According to an embodiment of the present disclosure, regions of the statistical map that have statistical values larger than a predetermined value may be extracted as the vertical-object part, and the regions of the statistical map that have statistical values smaller than the predetermined value may be extracted as the horizontal-object part, and the vertical-object part may contain a nearby part having smaller statistical values compared to the part having the statistical values larger than the predetermined value.

According to an embodiment of the present disclosure, in the performing of the map matching, the map matching may be performed based on the position of the autonomous driving apparatus which is estimated using data obtained by a motion sensor.

According to an embodiment of the present disclosure, in the estimation of a pose of the autonomous driving apparatus, the first statistical map may be compared with the vertical-object part and/or the horizontal-object part based on each point located in a search range, and the position having a highest mutual similarity may be estimated as a result.

According to an embodiment of the present disclosure, the position having the highest mutual similarity may mean to have the lowest error between the first statistical map and the vertical-object part and/or the horizontal-object part.

According to an embodiment of the present disclosure, in the estimation of a pose of the autonomous driving apparatus, a map matching may be performed using the first statistical map and the vertical-object part, and by using a result thereof, final map matching may be performed using the first statistical map and the horizontal-object part.

According to an embodiment of the present disclosure, in the estimation of a pose of the autonomous driving apparatus, the map matching may be performed using the first statistical map and the horizontal-object part, and by using the result thereof, final map matching may be performed using the first statistical map and the vertical-object part.

According to an embodiment of the present disclosure, in the estimation of a pose of the autonomous driving apparatus, map matching with respect to (h, r, p) may be performed using the first statistical map and the horizontal-object part to store values of (r', p') which minimize errors with respect to the respective h values, and map matching with respect to (x, y, h) may be performed using the map-statistical map and the vertical-object part to perform map matching with respect to (x, y, h, r', p') using values of (r', p') with respect to the respective h values stored in advance.

According to an embodiment of the present disclosure, in the estimation of a pose of the autonomous driving apparatus, after a map matching performed using the first statistical map and the horizontal-object part simultaneously with a map matching performed using the first statistical map and the vertical-object part, the two map matching results may be combined to obtain a final map matching result.

According to an embodiment of the present disclosure, in the estimation of a pose of the autonomous driving apparatus, a map matching with respect to (x, y, h) is performed using the first statistical map and the vertical-object part to calculate a value of (x', y', h') which minimize errors, and simultaneously, a map matching of the first statistical map and the horizontal-object part is performed with respect to (r, p, h) to store values of (r, p) which minimize errors with respect to respective h values, and (x', y', h', r', p') may be estimated as a final position by using (r', p') corresponding to h'.

According to an embodiment of the present disclosure, the map matching using the vertical-object part may be performed with respect to (x, y, h) or a part thereof, and the map matching using the horizontal-object part may be performed with respect to (z, h, r, p) or a part thereof.

According to an embodiment of the present disclosure, the map matching method may further include removing a part corresponding to a temporary object from the 3D points obtained by the detection sensor, the second statistical map and/or the vertical-object part.

According to an embodiment of the present disclosure, the map matching method may further include: acquiring coordinates of surrounding objects around the autonomous driving apparatus; and identifying the temporary object by comparing positions corresponding to the coordinates of the surrounding objects in the 3D map data in order to identify the part corresponding to the temporary object.

According to an embodiment of the present disclosure, the acquiring of the coordinates of the surrounding objects around the autonomous driving apparatus may include grouping the points indicating the same object of the 3D points input from the detection sensor, and acquiring the coordinate of the region that the same object of the grouped points occupies.

According to an embodiment of the present disclosure, in the identifying of the temporary object by comparing the positions corresponding to the coordinates of the surrounding objects in the 3D map data, a spatial feature of the corresponding coordinates may be found using statistical values corresponding to the coordinates of the surrounding objects in the first statistical map, and presence of a temporary object at the corresponding coordinates may be identified based on the spatial feature.

DETAILED DESCRIPTION

The present disclosure relates to a pose estimating method of the autonomous driving apparatus and the apparatus thereof, particularly, to an efficient pose estimating method for estimating an accurate pose of the autonomous driving apparatus within a 3D map in the autonomous driving apparatus and processing the estimation of the accurate pose in real time and the apparatus thereof.

Figure 1:
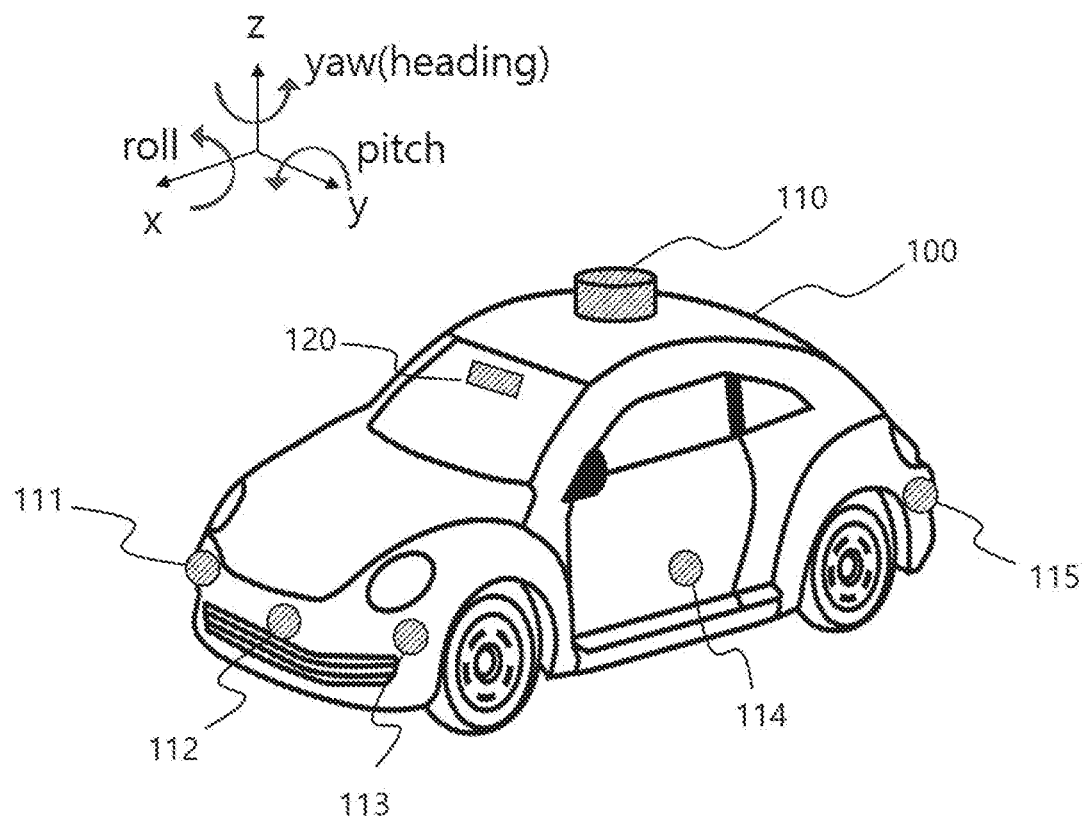
FIG. 1 illustrates an autonomous vehicle as an embodiment of an autonomous driving apparatus according to the present disclosure.

FIG. 1 illustrates an autonomous vehicle 100 as an embodiment of the autonomous driving apparatus according to the present disclosure.

The autonomous vehicle 100 in FIG. 1 includes at least some of a light detection and ranging (lidar) sensor, a radio detection and ranging (radar) sensor, a sound navigation and ranging (sonar) sensor, a camera, a GPS sensor, and an inertial measurement unit (IMU). First, the lidar, the radar, and/or the sonar sensor may be installed as a rotary sensor 110 at the top of a vehicle or as fixed sensors 111, 112, 113, 114, and 115 which are all installed on respective surfaces of the vehicle to sense fixed directions. A stereo camera 120 may be installed on a front side and/or a rear side of the vehicle or can be installed on each of the surfaces of the vehicle. The GPS sensor analyzes a signal from a GPS satellite to estimate a location of the autonomous vehicle 100, and the IMU generally has built-in three-axis accelerometer and three-axis angular velocity meter and can measure acceleration in a forward direction x, a transverse direction y, and a height direction z and angular velocity of roll that is rotated around an x-axis, pitch that is rotated around a y-axis, and yaw that is rotated around a z-axis. Here, the yaw rotation around the z-axis represents a proceeding direction of the autonomous driving apparatus and, thus, is also called heading. The IMU can calculate a velocity v and attitude angles (roll, pitch, and yaw) of the autonomous driving apparatus by using the measured acceleration and angular velocity.

Figure 2:
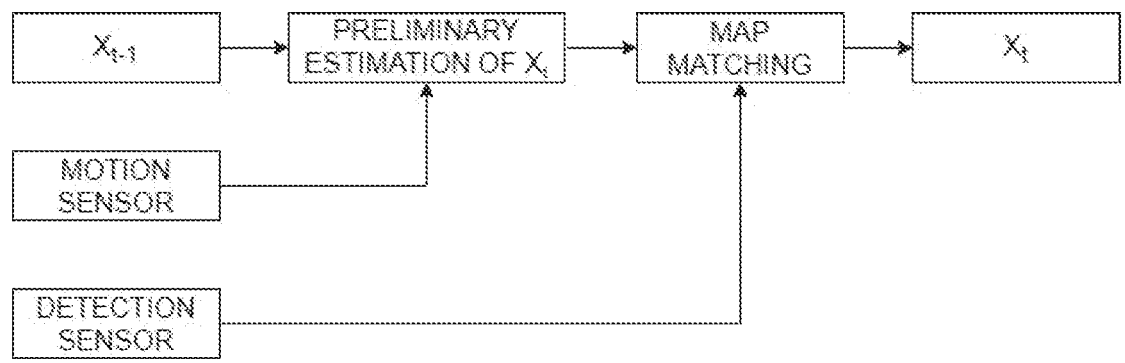
FIG. 2 illustrates an example of a pose estimating method according to the present disclosure.

FIG. 2 illustrates an example of a pose estimating method according to the present disclosure.

In the pose estimating method according to the present disclosure, a process for estimating a pose $X_t$ of the autonomous driving apparatus at a time of t from a pose $X_{t-1}$ of the autonomous driving apparatus at a time of t−1 is repeated. In a case of using an orthogonal coordinate system as an example, the pose $X_t$ of the autonomous driving apparatus is obtained by Equation (1) in which a pose $(x_t, y_t, z_t)$ and an attitude $(r_t, p_t, h_t)$ of the autonomous driving apparatus in a three dimension are expressed as a vector.

$$X_t = [x_t, y_t, z_t, r_t, p_t, h_t]$$ Equation(1)

Here, $(x_t, y_t, z_t)$ is a coordinate indicating, in the orthogonal coordinate system, a pose (x, y, z) of the autonomous driving apparatus in the three dimension, and $(r_t, p_t, h_t)$ represents a rotation angle indicating the attitude (roll, pitch, heading) of the autonomous driving apparatus in the three dimension at a time t. Here, $r_t$ represents the rotation angle (roll) around a forward direction x of the autonomous driving apparatus, $p_t$ represents the rotation angle (pitch) around an axis y which is horizontally orthogonal to the forward direction of the autonomous driving apparatus, $h_t$ represents a horizontal forward direction (heading) of the autonomous driving apparatus, as the rotation angle (yaw) around an axis z which is vertically orthogonal to the forward direction of the autonomous driving apparatus.

First, the basic 3D pose $(x_t, y_t, z_t)$ and attitude $(r_t, p_t, h_t)$ of the autonomous driving apparatus 100 are primarily estimated from a result obtained from a motion sensor. Here, the motion sensor may use the GPS sensor and/or the IMU as an embodiment thereof. For example, when velocity $v_t$ at a time t and the 3D attitude $(r_t, p_t, h_t)$ of the autonomous driving apparatus are obtained from the IMU, the autonomous driving apparatus is assumed moving at a velocity of $v_t$ while maintaining the 3D attitude $(r_t, p_t, h_t)$, and thus it is possible to estimate the 3D pose $(x_t, y_t, z_t)$. However, the 3D pose and attitude obtained from the IMU contains an error generated in the inertial measurement unit and, thus, does not meet a degree of accuracy suitable for autonomous driving. Hence, the error generated in preliminary estimation is minimized through the following map matching process. As described above, the basic map matching process on the basis of the orthogonal coordinate system is described; however, the map matching process is only an embodiment of the present disclosure, and the map matching process according to the present disclosure is not limited to the orthogonal coordinate system and can be realized by another coordinate system or another description method.

Here, the preliminary estimation of the 3D pose and attitude of the autonomous driving apparatus using the motion sensor is performed to reduce a search space that needs to be considered in the map matching process, and the preliminary estimation thereof is not a necessary process. In other words, when the autonomous driving apparatus has sufficient processing power, the preliminary estimation is omitted, and $X_t$ can be directly estimated by applying the map matching with $X_{t-1}$ as a reference. In other words, according to an embodiment of the present disclosure, after the preliminary estimation is performed using the motion sensor, a pose of the autonomous driving apparatus can be determined using the map matching. In addition, according to another embodiment of the present disclosure, a pose of the autonomous driving apparatus can be determined using the map matching without a preliminary estimation process.

Next, in the map matching process, 3D information of surroundings around the autonomous driving apparatus 100 obtained by a detection sensor is compared with 3D map data stored in advance, and the pose of the autonomous driving apparatus is determined in a 3D map. Here, as an embodiment of the detection sensor, a lidar sensor, a radar sensor, and/or a sonar sensor can be used. In addition, 3D information of the surroundings can be obtained using 3D image information obtained from a camera as another embodiment of the detection sensor. In one embodiment according to the present disclosure, as the detection sensor, one of the lidar sensor, the radar sensor, the sonar sensor, or the camera can be used. In addition, in another embodiment according to the present disclosure, as the detection sensor, two or more sensors of the lidar sensor, the radar sensor, the sonar sensor, and the camera can be used, and detection results of the sensors can be combined to be used as a result of the detection sensor.

Items of 3D data of the surroundings obtained from the detection sensor are information of a surrounding object positioned in a 3D space, represent a 3D coordinate at which the object is detected or a physical quantity measured at the corresponding coordinate, and are referred to as 3D points in the present disclosure.

According to one embodiment of the present disclosure, the present disclosure can include a process for converting 3D points contained in the 3D map data before the map matching and/or 3D points obtained from the detection sensor into a statistical map. The 3D points obtained from the 3D map data or the detection sensor are related to a 3D space and are data represented by 3D coordinates. In the statistical map, a 3D coordinate system is divided in accordance with a predetermined rule, and statistical values of the points contained in respective divided regions are obtained such that the 3D information is statistically described using the statistical values. As the statistical value that can be used in the statistical map, a mean, a mode, a maximum, a median, a minimum, a range, an interquartile range, a quartile deviation, a variance, a standard deviation, a coefficient of variation, a covariance, or the like can be used; however, the statistical value is not limited thereto, and one or more values can be selected to be used from all possible statistical values.

In an embodiment of the statistical map, a 3D space can be divided into regular hexahedrons having an equal size, and statistical values of 3D points contained in respective regular hexahedrons are calculated such that the 3D information can be displayed. A use of the statistical map is advantageous in that the 3D data decreases in size, and an amount of processing for comparing the 3D map data with 3D surrounding data is reduced in the map matching process.

As another embodiment of the statistical map, a 3D space can be divided with respect to a 2D plane, statistical values can be calculated with respect to the remaining dimension, and 3D information can be displayed as the statistical map projected on the 2D plane. In an example of an orthogonal coordinate system (x, y, z), x and y axes on an (x, y) plane can be divided into grids at regular intervals, statistical values of z values of 3D points corresponding to the respective grids can be calculated, and 3D information can be displayed as the statistical map. For example, means of the z values corresponding to respective grids can be calculated and can be displayed on the (x, y) plane to generate the statistical map. As another embodiment, a (y, z) plane can be divided into grids at regular intervals, values (median or standard deviation) of x values of 3D points corresponding to the respective grids can be calculated, and 3D information can be displayed as the statistical map. In this case, a statistical map can be obtained, in which the 3D information is represented by statistical values on the 2D plane, and a use of the statistical map is effective in that the amount of processing for map matching is reduced.

As another embodiment of the statistical map, an (r, θ) plane can be divided using a cylindrical coordinate system (r, θ, z) in accordance with a determined rule such that statistical values of z values can be displayed. For example, regions divided from the (r, θ) plane can have an arc shape with a thickness, and modes of z values of 3D points corresponding to the respective regions can be calculated and displayed as the statistical map. As another embodiment according to the present disclosure, a spherical coordinate system (r, θ, φ) can be used, the 2D plane in this case can divide (r, φ) plane into regions having an arc shape with a thickness, and the statistical map can be described by statistical values of θ corresponding to the respective divided regions. Besides, various coordinate systems can be used, and various methods for dividing the 2D plane into a plurality of regions can be used.

In addition, according to another embodiment of the present disclosure, in order to obtain a statistical map, every region can be divided in accordance with one rule as a rule of division of a 3D coordinate, and the 3D coordinate can be divided into two or more regions and the respective regions can be divided in accordance with different rules. In addition, in a case where the 3D coordinate is divided with respect to the 2D plane, all of the regions can be divided in accordance with one rule as necessary, or the 2D plane can be divided into certain ranges and the respective ranges can be divided in accordance with different rules.

In addition, according to still another embodiment of the present disclosure, in a process for dividing the 3D coordinate in order to obtain the statistical map, a 3D coordinate is primarily divided, the 3D points contained in respective divided regions are analyzed, and the regions can be additionally divided in a case where the regions need to be divided.

Figure 3:
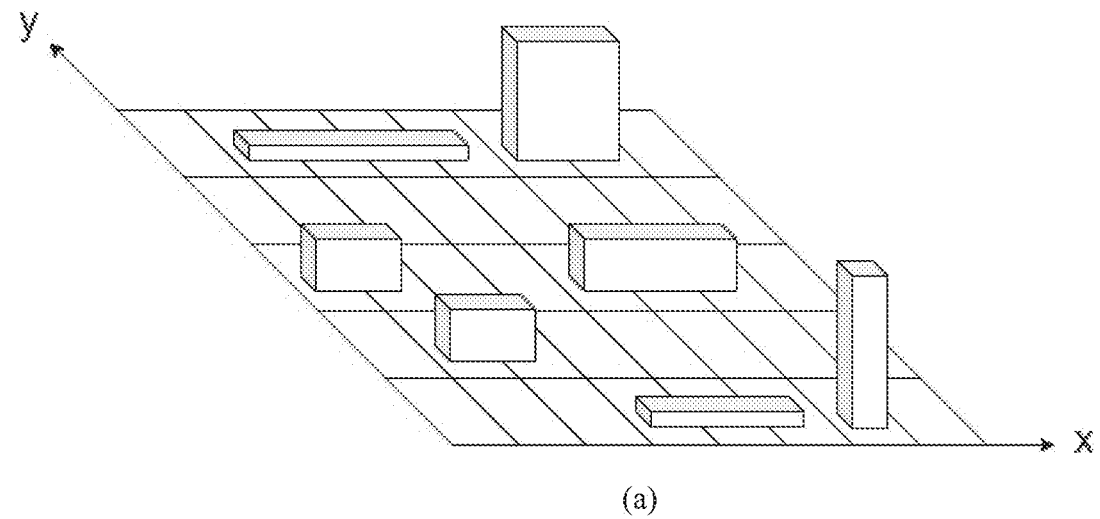
FIGS. 3A and 3B conceptually illustrate a 3D structure and a statistical map thereof according to an embodiment of the present disclosure.
Figure 3:
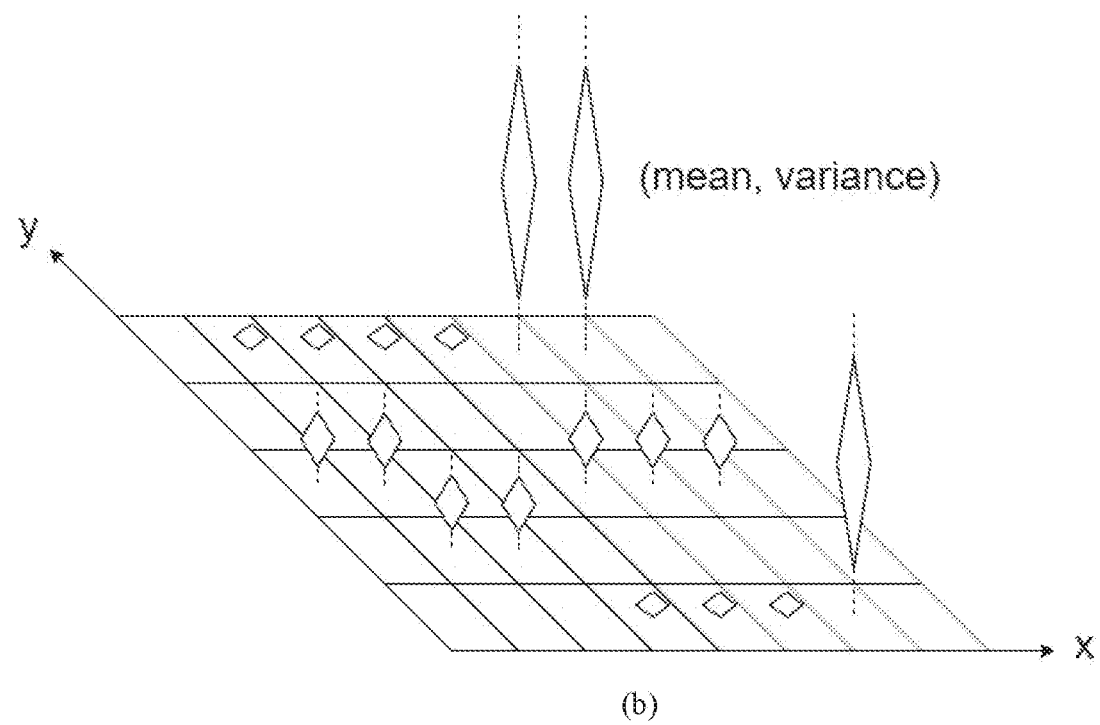

FIG. 3 conceptually illustrates a 3D structure and a statistical map thereof according to an embodiment of the present disclosure.

FIG. 3 describe a concept of the statistical map on the basis of an orthogonal coordinate system (r, y, z). In an embodiment illustrated in FIG. 3, an x axis and a y axis are divided to form evenly spaced grids on an (x, y) plane, each grids are considered a divided region, and means and variances of height z values of regions corresponding to respective grids in a 3D map data are calculated and stored as values for the respective grids.

For example, when a 3D structure having a shape illustrated in FIG. 3(a) is present in a 3D map, the means and variances of height values represented in the 3D map which correspond to the respective grids are calculated and stored as values for the respective grids. As a result, in the statistical map, values (means and variances) are stored for the respective grids, and the 3D structure stored in the 3D map is simplified and illustrated with means and variances of heights of 2D grids as in FIG. 3(b).

Conversion of the 3D map data and/or the 3D surrounding data into the statistical map as illustrated in FIG. 3(b) is advantageous in that a total amount of data decreases, and an amount of processing for comparison to perform the map matching decreases. In addition, height z is a feature of the 3D structure in 3D surrounding information for the autonomous driving apparatus, and thus there is no great difference in accuracy even when the statistical map illustrated in FIG. 3B is extracted and used.

In addition, according to an embodiment of the present disclosure, in conversion of 3D surrounding data obtained from the 3D map data and/or the detection sensor into the statistical map, it is possible to check whether 3D points contained in one of the divided regions are divided into two or more groups. It is possible to check whether the 3D points positioned within a predetermined distance are grouped to form a group and two or more groups that are separated from each other by a distance more than the predetermined distance are formed. The two or more groups obtained through such a process are groups of points of which the closest 3D points are positioned at a distance longer than the predetermined distance.

According to an embodiment of the present disclosure, when the two or more divided groups are found in the one divided region, the one divided region can be divided again into regions such that one group is present in the one divided region.

According to another embodiment of the present disclosure, when two or more divided groups are found, the number of points that are contained in each group is checked, and the group can be determined as a kind of outlier and can be deleted when the number is smaller than a certain value. In addition, only when the number of points contained in each group is greater than the certain value, the groups are determined as separate objects, a space in which the corresponding groups are present is divided again such that a new region is defined, and statistical values for the corresponding regions can be calculated and displayed as the statistical map.

For example, regarding a traffic signal positioned on a road, a column part is positioned on a sidewalk, and a traffic signal part is extended into the air from the column and is positioned above the road. In a case where a 3D space is divided with respect to the (x, y) plane, and the statistical map is configured of statistical values of heights of 3D points contained in a region divided into 2D grids, when a statistical value of heights corresponding to 2D grids over the road at which the traffic signal part is positioned in the air is extracted, a statistical value of both a road part and the traffic signal part positioned in the air is calculated. In this case, the calculated statistical value is not considered to reflect the actual 3D structure.

According to an embodiment of the present disclosure, when grouping of 3D points positioned within a certain distance and presence of two or more groups are checked, it can be checked whether a group corresponding to the road and a group corresponding to the traffic signal part is divided, and the region can be divided into two regions that contain the respective groups. According to another embodiment of the present disclosure, when the number of points that are contained in each checked group is smaller than a predetermined value, the group can be determined as an outlier and can be simply removed.

Figure 4:
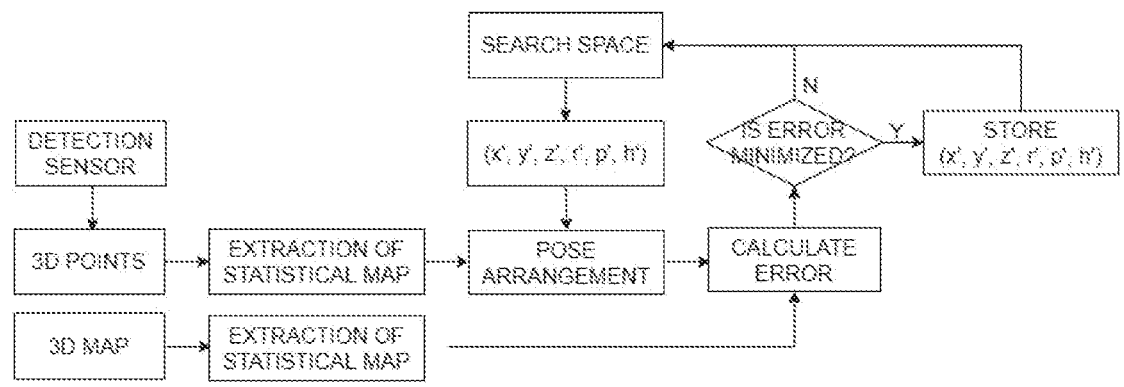
FIG. 4 illustrates fundamental process of a map matching according to an embodiment of the present disclosure.

FIG. 4 illustrates fundamental process of map matching according to an embodiment of the present disclosure. FIG. 4 and the following description are provided on the basis of the orthogonal coordinate system; however, FIG. 4 and the following description are provided only as an embodiment, and the map matching of the present disclosure is not limited to FIG. 4 and the following description.

The map matching process illustrated in FIG. 4 according to an embodiment of the present disclosure is basically performed by extracting respective statistical maps from the 3D map data and the 3D surrounding data obtained by the detection sensor, assuming that the autonomous driving apparatus is present at an estimated pose (x', y', z', r', p', h') within a search space, calculating an error by comparing the two statistical maps, repeating these processes by changing estimated poses of the autonomous driving apparatus, and estimating the pose (x', y', z', r', p', h') by which the error is minimized as a pose of the autonomous driving apparatus.

According to an embodiment of the present disclosure illustrated in FIG. 4, a certain range from a preliminary estimated pose of the autonomous driving apparatus is set as a search space, the autonomous driving apparatus is assumed to be present at all of the poses contained in the search space, and a process for calculating an error by comparing the two statistical maps can be repeated. In an embodiment according to the present disclosure, a pose of the autonomous driving apparatus which is estimated from the motion sensor can be used as the preliminary estimated pose. According to another embodiment of the present disclosure, the preliminary estimated pose can be an estimated pose $(X_{t-1})$ of the autonomous driving apparatus at (t−1).

In the process according to an embodiment of the present disclosure illustrated in FIG. 4, the map matching is described to be performed with consideration for all the six degrees of freedom (6 DOF) of the autonomous driving apparatus; however, according to another embodiment of the present disclosure, the degrees of freedom considered in the map matching can be reduced to reduce the amount of processing, or, after the six degrees of freedom are divided into two or more degrees of freedom and the map matching is performed, the map matching can be performed by combining results thereof.

According to an embodiment of the present disclosure, a substantially accurate value for a height z of the autonomous driving apparatus can be calculated by a method of adding a height of the autonomous driving apparatus to a height of a ground surface corresponding to a 2D coordinate in the 3D map data, and this can be excluded in the matching process and the map matching can be performed with respect to the remaining degrees of freedom. In addition, according to an embodiment of the present disclosure, a pose (x, y) on the 2D plane and a forward direction (h) are important for the autonomous driving apparatus, and thus the map matching can be performed with respect to only (x, y, h) with consideration for only three degrees of freedom (3 DOF).

In addition, according to another embodiment of the present disclosure, map matching can be divided into a plurality of map matching of three or less degrees of freedom, and respective map matching results can be combined to obtain a map matching result of six degrees of freedom. Here, the plurality of map matching can be divided into a plurality of combinations of map matching of degrees of freedom which are different from each other or can be divided into a plurality of combinations of map matching of degrees of freedom which are partially different. As an example of the combinations of map matching of degrees of freedom which are different from each other, after map matching is performed with respect to each of (x, y, h) and (z, r, p), two results thereof can be combined to obtain a map matching result approximate to the six degrees of freedom. As another example, after map matching is performed with respect to each of (x, y, h) and (r, p), the height z value is calculated by adding a height of a vehicle to a height of a ground (x, y) on which the autonomous vehicle is positioned, and thereby a map matching result approximate to the six degrees of freedom can be obtained. As still another example, the map matching can be performed with respect to each of (x, y) and (r, p, h).

As an example of the combinations of map matching of degrees of freedom which are partially different, after map matching is performed with respect to each of (x, y, h) and (r, p, h), two results thereof can be combined to obtain a map matching result approximate to the six degrees of freedom. As still another example, after the map matching is performed for each of (x, y, h) and (x, r, p) or (x, y, h) and (y, r, p), two results thereof can be combined.

Figure 5:
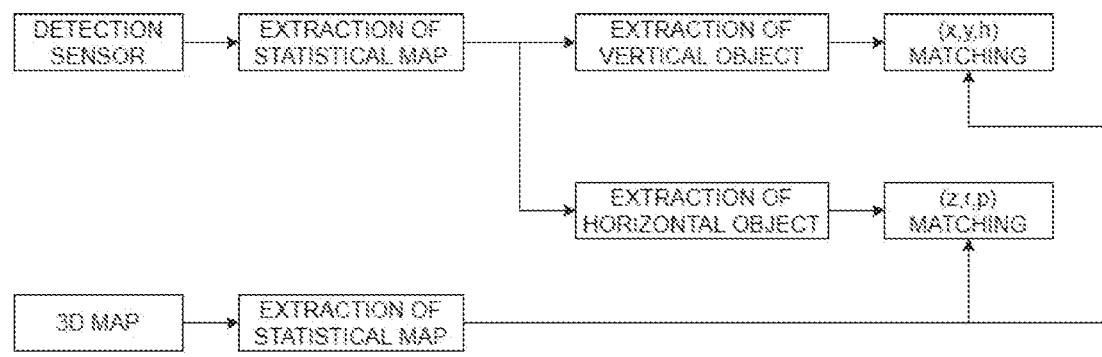
FIG. 5 illustrates an embodiment according to the present disclosure in which a vertical-object part and a horizontal-object part are extracted from a second statistical map obtained by a detection sensor and each part is used in separate map matching process.

FIG. 5 illustrates an embodiment according to the present disclosure in which a vertical-object part and a horizontal-object part are extracted from a second statistical map obtained by a detection sensor and the part is used in separate map matching process.

The 3D data of the surroundings which is obtained from the detection sensor contains a horizontal object such as a road or a sidewalk and a vertical object such as a tree, a building, a curb, a car, or a passerby. For example, when a 2D plane ((x, y) plane in a case of the orthogonal coordinate system) corresponding to the ground which contains 3D points obtained from the detection sensor is divided, and conversion into the statistical map in which variance values of the z values of the 3D points corresponding to respective divided regions are used as statistical values is performed, a divided region corresponding to a vertical object has a high variance value with respect to the height z, and a divided region corresponding to a horizontal object has a low variance value. Consequently, the statistical map can be divided into a part of the vertical object and a part of the horizontal object depending on the variance value, and the parts can be extracted. The part of the vertical object can contain a part having a low variance value which is positioned around a part having a high variance value and is positioned within a certain distance such that the vertical object can be clearly identified.

In the vertical-object part, an error increases due to a horizontal position (for example, x and y in the orthogonal coordinate system) and a change (h) in attitude. In the horizontal-object part, an error increases due to a vertical position (z in the orthogonal coordinate system) and a change (r, p) in attitude. Consequently, in the example of the orthogonal coordinate system, the vertical-object part can be used when subset groups of (x, y, h) are matched as major groups, and the horizontal-object part can be used when subset groups of (z, r, p) are matched as major groups. According to an embodiment of the present disclosure, as illustrated in FIG. 5, while the map matching is performed with the division of (x, y, h) and (z, r, p), the map matching can be performed with respect to (x, y, h) by using the vertical-object part, and the map matching can be performed with respect to (z, r, p) by using the horizontal-object part.

According to another embodiment of the present disclosure, an error of the height is not large even when the height z of the autonomous driving apparatus is not determined by the map matching, and thus the map matching can be performed with respect to the vertical-object part and the horizontal-object part with division into (x, y, h) and (r, p). In addition, according to still another embodiment of the present disclosure, the map matching with the vertical-object part and the horizontal-object part can be performed with division into (1) (x, y, h) and (x, r, p), (2) (x, y, h) and (y, r, p), or (3) (x, y, h) and (h, r, p).

Figure 6:
FIG. 6 illustrates embodiments according to the present disclosure, of methods for combining the two map matching results after map matchings are performed in two different groups.
Figure 6:
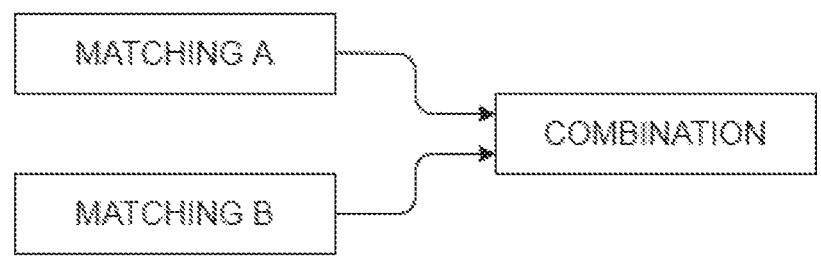
Figure 6:
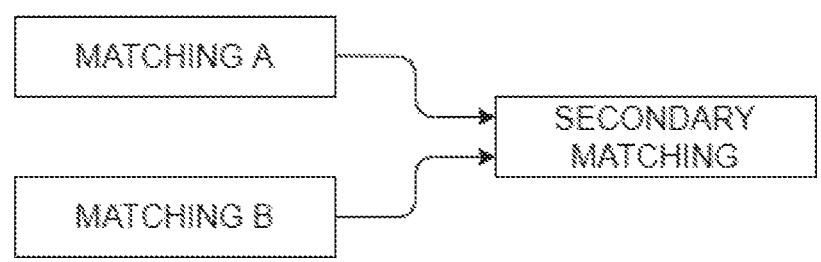

FIG. 6 illustrates embodiments according to the present disclosure, of which methods for combining the two map matching results after the map matchings are performed in two different groups.

According to an embodiment of the present disclosure illustrated in FIG. 6(a), matching B can be performed using a result obtained in matching A so as to obtain a final map matching result. For example, map matching with respect to (x, y, h) is performed in the matching A to obtain a value of (x', y', h') by which an error is minimized, the value of (x', y', h') by which the error is minimized is assumed in the matching B, and matching with respect to (z, r, p) is performed to finally obtain a map matching result with respect to the six degrees of freedom (x, y, z, h, p, r). Another embodiment of the present disclosure can employ a method for obtaining final (x', y', h', r', p') by storing values of (r', p'), by which an error is minimized, with respect to respective values of h while map matching with respect to (h, r, p) is performed, then, retrieving the values of (r', p') stored with respect to the respective values of h while map matching with respect to (x, y, h) is performed, and performing map matching with respect to (x, y, h, r', p') to find (x', y', h') by which the error is minimized.

According to an embodiment of the present disclosure illustrated in FIG. 6(b), the matching A and the matching B can be performed individually and results thereof can be finally combined. For example, the matching with respect to (x, y, h) is performed in the matching A and matching with respect to (z, r, p) is performed in the matching B such that (x', y', h') and (z', r', p'), by which the error is minimized, obtained in the two events of matching can be simply combined to obtain a final matching result. According to still another embodiment of the present disclosure, map matching with respect to (x, y, h) is performed to obtain (x', y', h'), by which the error is minimized, in the matching A, the values (r', p'), by which the error is minimized, are stored in advance with respect to respective values of h while map matching with respect to (r, p, h) is performed in the matching B, and (x', y', h') obtained in the matching A in a combination step and a result (r', p', h') of the matching B which correspond to h acquired in the matching A can be combined to obtain the final matching result.

According to an embodiment of the present disclosure illustrated in FIG. 6(c), the matching A and the matching B can be performed individually, and, based on results thereof, a final map matching result can be obtained using the map matching again. For example, while events of map matching are performed with respect to each of (x, y, h) and (r, p, h), the values of (x, y), by which the error is minimized, are stored with respect to the respective values of h in the matching A, the values of (r, p), by which the error is minimized, are stored with respect to the respective values of h in the matching B, and a value of h, by which a total error is minimized, can be found in secondary matching.

FIG. 6 illustrates cases of performing map matching with the division into two combinations; however, according to the present disclosure, even in a case of performing the map matching with division into three or more combinations, a final map matching result can be obtained by expanding the methods illustrated in FIG. 6. According to an embodiment of the present disclosure, three events of map matching can be sequentially performed, the three events of map matching can be simultaneously performed and results thereof can be combined, the three events of map matching can be simultaneously performed and, then, final matching can be again performed using results thereof, or two events of map matching can be simultaneously performed and the third map matching can be finally performed using results thereof. For example, map matching can be performed with respect to (x, y, h) and (r, p, h) to obtain a map matching result with respect to (x, y, h, r, p), and then map matching of obtaining a value of z, by which the error is minimized, can be performed to finally obtain a map matching result with respect to (x, y, z, h, r, p).

Figure 7:
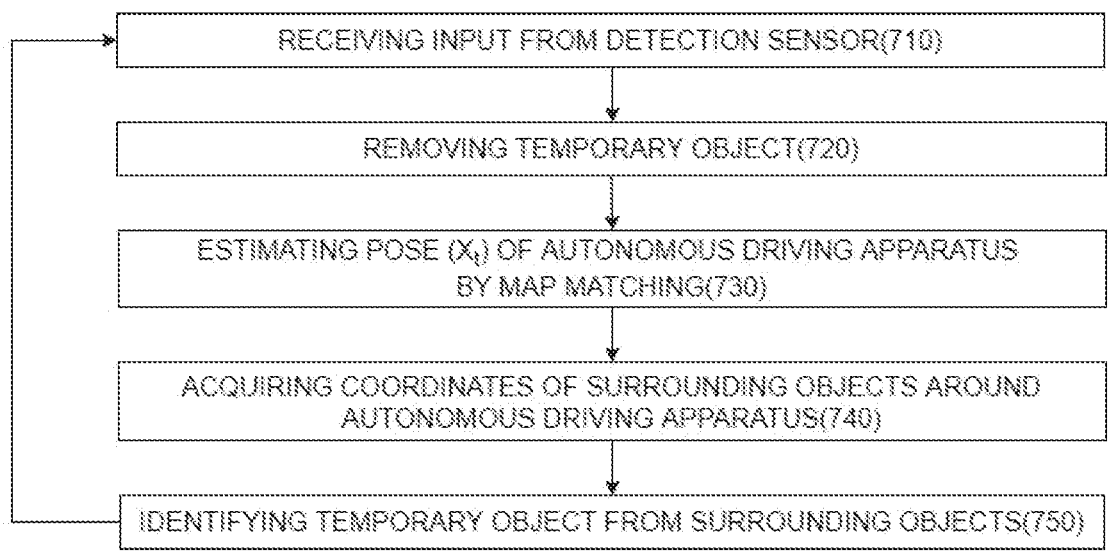
FIG. 7 illustrates a configuration in which a temporary object is removed from surrounding data obtained by the detection sensor prior to the map matching according to an embodiment of the present disclosure.

FIG. 7 illustrates a configuration in which a temporary object is removed from 3D surrounding data obtained by the detection sensor prior to the map matching according to an embodiment of the present disclosure.

A process for recognizing a temporary object and removing the temporary object before the map matching according to an embodiment of the present disclosure illustrated in FIG. 7 is as follows.

First, the 3D data of the surroundings is input from the detection sensor (Step 710). The temporary objects are removed from the 3D data (Step 720). Through the map matching according to the present disclosure, the pose $X_t$ of the autonomous driving apparatus is estimated (Step 730). The autonomous driving apparatus is assumed being positioned at the pose $X_t$, and coordinates of the objects detected in the surroundings are acquired (Step 740). The temporary objects are identified by comparing the positions corresponding to the coordinates of the surrounding objects in the 3D map data (Step 750). Next, the process returns to Step 710, and the steps are repeatedly executed.

Here, Step 740 of acquiring the coordinates of the surrounding objects around the autonomous driving apparatus cab be subdivided into Step 741 of grouping the same object in the 3D data for the surroundings input from the detection sensor and Step 742 of acquiring a coordinate of a region which the same grouped object occupies.

First, Step 741 of grouping the same object in the 3D data detected with respect to the surroundings can be executed by various methods. For example, objects disposed within a predetermined distance can be grouped as the same object, an object having a continuous outline can be grouped as the same object, or object grouping can be performed using image processing.

In addition, after the grouping, the coordinate of the region which the same grouped object occupies is acquired (Step 742). Here, the coordinate of the region which the same grouped object occupies can be represented by a group of all coordinates at which the object is present or can be represented by coordinates corresponding to the outline of the object.

According to an embodiment of the present disclosure, Step 740 of acquiring the coordinates of surrounding objects around the autonomous driving apparatus can be executed by extracting the statistical map from the 3D surrounding data. In this case, the coordinate of the region which the object occupies can mean coordinates on the 2D plane on which the object is positioned. For example, in the case of the orthogonal coordinate system, the region of grids in which an object is positioned on the (x, y) plane can be represented by the region which the object occupies.

Next, the temporary object is identified by comparing the positions corresponding to the coordinates of the surrounding objects in the 3D map data (Step 750), and when the corresponding object is not present at a position corresponding to the coordinates of the surrounding object in the 3D map data, the corresponding object can be recognized as the temporary object. For example, when the position corresponding to the coordinates of one surrounding object in the 3D map data corresponds to a road or a sidewalk, the corresponding surrounding object can be recognized as the temporary object.

According to an embodiment of the present disclosure, it is possible to identify the position corresponding to the coordinates of the surrounding objects by using a statistical map extracted from the 3D map data. The regions of the surrounding object in the statistical map correspond to the divided regions of the 2D plane in which the surrounding object is positioned, spatial features of the corresponding divided regions can be found using the statistical values stored for the corresponding divided region, and whether the corresponding surrounding objects in the first statistical map are identified as the temporary object can be discerned based on the spatial feature.

According to an embodiment of the present disclosure, in Step 720 of removing the temporary object from the 3D surrounding data, data corresponding to the temporary object can be removed from the 3D surrounding data obtained from the detection sensor, or a part corresponding to the temporary object can be removed from the statistical map extracted from the 3D surrounding data. In addition, according to another embodiment of the present disclosure, in a case where a vertical object and a horizontal object are divided and extracted from the statistical map of the 3D surrounding data, the temporary object can be removed from the vertical-object part.

Figure 8:
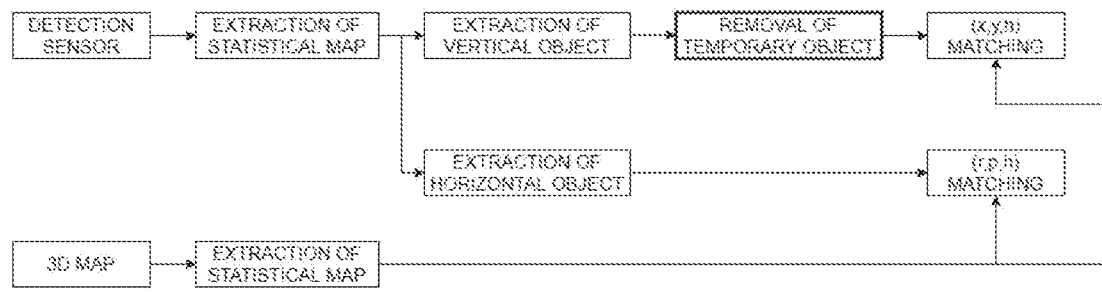
FIG. 8 illustrates a method for removing a temporary object and map matching according to an embodiment of the present disclosure.

FIG. 8 illustrates method for removing a temporary object and a map matching according to an embodiment of the present disclosure.

In an embodiment illustrated in FIG. 8, the 3D data of the surrounding environment obtained from the detection sensor is converted into the statistical map, the statistical map is divided into the vertical-object part and the horizontal-object part depending on the variance values of the divided regions of the statistical map, and the temporary object part is removed from the vertical-object part. Next, the statistical map is extracted from the 3D map data, the map matching (vertical map matching) with respect to the vertical-object part and (x, y, h) is performed, and the map matching (horizontal map matching) with respect to the horizontal-object part and (r, p, h) is performed. The results of the vertical map matching and the horizontal map matching can be combined through various methods as illustrated in FIGS. 6A to 6C, and the map matching result can be finally obtained with respect to five degrees of freedom (x, y, h, r, p). In addition, the height z can be determined as a value obtained by adding a constant (height of the car) to a ground height of the 3D map corresponding to corresponding (x, y).

When the pose $(X_t)$ of the autonomous driving apparatus is determined, the objects are recognized from the 3D surrounding data obtained from the detection sensor, the coordinates of the corresponding objects are calculated, and whether the corresponding object is the temporary object is identified by comparing the corresponding coordinate with the 3D map data. According to another embodiment of the present disclosure, it is possible to identify the surrounding objects in the statistical map and to calculate the coordinates of the corresponding objects. In addition, according to the other embodiment of the present disclosure, it is possible to identify the surrounding objects in the vertical-object part of the statistical map and to calculate the coordinates of the corresponding objects. In addition, according to an embodiment of the present disclosure, when a mean of variance values of the coordinates at which the object is positioned in the statistical map of the 3D map is calculated to be smaller than a predetermined threshold value, the object can be identified as the temporary object.

The map matching method for autonomous driving and the apparatus thereof according to the present disclosure are described as described above with reference to the drawings in this application; however, the present disclosure is not limited to the drawings and the described configuration method. Various coordinate systems, sensors, algorithms, and devices other than those disclosed in this application can be used as a configuration of the present disclosure, and the scope of right thereof is not limited to the configurations and methods disclosed in this application. Those skilled in the art will understand that various modification changes of the present disclosure can be performed within a scope of the objects and effects of the present disclosure. In addition, a singular or plural term in this specification can be construed to include both the singular and plural term, unless essential.

According to the map matching method or the apparatus of the present disclosure, the following effect is achieved. It is possible to estimate an accurate pose of the autonomous driving apparatus to minimize a pose error, even with an amount of processing which can be performed in real time.

In addition, another effect is achieved in that it is possible to efficiently remove a part corresponding to a temporary object from 3D data of surroundings recognized by the detection sensor of the autonomous driving apparatus and to more accurately obtain the pose of the autonomous driving apparatus which is estimated by the map matching.

While the present disclosure has been described with respect to the specific embodiments, it will be apparent to those skilled in the art that various changes and modifications may be made without departing from the spirit and scope of the present disclosure as defined in the following claims.

All of the disclosed methods and procedures described in this disclosure can be implemented, at least in part, using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors or other hardware components which, when executing the series of computer instructions, perform or facilitate the performance of all or part of the disclosed methods and procedures.

As used herein, the singular forms "a", "an" and "the" are intended to include the plural forms as well, unless otherwise indicated. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout the specification to "various embodiments," "some embodiments," "one embodiment," "an embodiment," "another embodiment," or the like, means that a particular feature, structure, or characteristic described in connection with the embodiment is included in at least one embodiment. Thus, appearances of the phrases "various embodiments," "some embodiments," "one embodiment," "an embodiment," "another embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation. Such modifications and variations are intended to be included within the scope of the present invention.

What is claimed is:

1. A map matching method for autonomous driving that is performed by one or more processors for an autonomous driving apparatus, the map matching method comprising:
   extracting, by the one or more processors, a first statistical map from 3D points of 3D map data;
   extracting, by the one or more processors, a second statistical map from 3D points obtained by a detection sensor of the autonomous driving apparatus simultaneously or after the previous extraction of the first statistical map;
   dividing, by the one or more processors, the second statistical map into a vertical-object part and a horizontal-object part depending on statistical values of respective divided regions of the second statistical map; and
   estimating, by the one or more processors, a pose of the autonomous driving apparatus by comparing the horizontal-object part or the vertical-object part with the first statistical map,
   wherein regions of the statistical maps that have statistical values larger than a predetermined value are extracted as the vertical-object part, and regions of the statistical maps that have statistical values smaller than the predetermined value are extracted as the horizontal-object part.

2. The map matching method of claim 1, wherein in the first and second statistical maps, a 3D space is divided in accordance with a predetermined rule, and one or more statistical values of 3D points contained in a divided region represent the 3D points in the divided region.

3. The map matching method of claim 2, wherein in the statistical maps, a 3D space is divided with respect to a 2D plane and one or more statistical values of the remaining dimension of 3D points contained in the divided region are calculated and are represented on the 2D plane.

4. The map matching method of claim 3, wherein, in the statistical maps, an (x, y) plane is divided into evenly spaced grids in the Cartesian coordinate system, and one or more statistical values of height z values of 3D points corresponding to the respective grids are represented on the (x, y) plane.

5. The map matching method of claim 3, wherein, in the statistical maps, statistical values of height z values corresponding to regions formed by dividing r and θ of an (r, θ) plane evenly in the cylindrical coordinate system are represented on the (r, θ) plane.

6. The map matching method of claim 3, wherein, in the statistical maps, statistical values of respective θ values of 3D points corresponding to regions formed by dividing r and φ of an (r, φ) plane evenly in the spherical coordinate system are represented on the (r, φ) plane.

7. The map matching method of claim 2, wherein in the statistical maps, whether 3D points contained in each divided region are separated into two or more groups is detected.

8. The map matching method of claim 7, wherein in the statistical maps, when the two or more separated groups of 3D points are detected in a divided region, the divided region is divided again such that each one of divided regions contains one group of 3D points only.

9. The map matching method of claim 1, wherein the vertical-object part contains a nearby part having smaller statistical values compared to the part having the statistical values larger than the predetermined value.

10. The map matching method of claim 1, wherein in the performing of the map matching, the map matching is performed based on the location of the autonomous driving apparatus which is estimated using data obtained by a motion sensor.

11. The map matching method of claim 1, wherein in the estimating a pose of the autonomous driving apparatus, the first statistical map is compared with the vertical-object part or the horizontal-object part, based on each points located in a search range, and the position having a highest mutual similarity is estimated as a result.

12. The map matching method of claim 1, wherein in the estimating a pose of the autonomous driving apparatus, a map matching is performed using the first statistical map and the vertical-object part, and by using the result thereof, final map matching is performed using the first statistical map and the horizontal-object part.

13. The map matching method of claim 1, wherein in the estimating a pose of the autonomous driving apparatus, a map matching is performed using the first statistical map and the horizontal-object part, and by using the result thereof, final map matching is performed using the first statistical map and the vertical-object part.

14. The map matching method of claim 13, wherein in the estimating a pose of the autonomous driving apparatus, map matching with respect to (h, r, p) is performed using the first statistical map and the horizontal-object part to store values of (r', p') which minimize errors with respect to the respective h values, and map matching with respect to (x, y, h) is performed using the first statistical map and the vertical-object part to perform map matching with respect to (x, y, h, r', p') using the values of (r', p') with respect to the respective h values stored in advance.

15. The map matching method of claim 1, wherein in the estimating a pose of the autonomous driving apparatus, after a map matching performed using the first statistical map and the horizontal-object part simultaneously with a map matching performed using the first statistical map and the vertical-object part, the two map matching results are combined to obtain a final map matching result.

16. The map matching method of claim 15, wherein in the estimating a pose of the autonomous driving apparatus, map matching with respect to (x, y, h) is performed using the first statistical map and the vertical-object part to calculate the value of (x', y', h') which minimize errors, and simultaneously, map matching of the first statistical map and the horizontal-object part with respect to (r, p, h) is performed to store values of (r, p) which minimize errors with respect to the respective h values, and (x', y', h', r', p') is estimated as a final position by using (r', p') corresponding to h'.

17. The map matching method of claim 12, wherein the map matching using the vertical-object part is performed with respect to (x, y, h) or a part thereof, and the map matching using the horizontal-object part is performed with respect to (z, h, r, p) or a part thereof.

18. The map matching method of claim 1, further comprising:
removing a part corresponding to a temporary object from the 3D points obtained by the detection sensor, the second statistical map, or the vertical-object part.

19. The map matching method of claim 18, further comprising:
acquiring coordinates of surrounding objects around the autonomous driving apparatus; and
identifying the temporary object by comparing the positions corresponding to the coordinates of the surrounding objects in the 3D map data in order to identify the part corresponding to the temporary object.

20. The map matching method of claim 19, wherein the acquiring of the coordinates of the surrounding objects around the autonomous driving apparatus further comprises:
grouping the points indicating the same object of the 3D points input from the detection sensor, and
acquiring the coordinate of the region which the same object of the grouped points occupies.

21. The map matching method of claim 19, wherein in the identifying of the temporary object by comparing the positions corresponding to the coordinates of the surrounding objects in the 3D map data, a spatial feature of the corresponding coordinates is found using statistical values corresponding to the coordinates of the surrounding objects in the first statistical map, and presence of a temporary object at the corresponding coordinates is identified based on the spatial feature.

22. A non-transitory, tangible computer-readable storage medium on which computer readable instructions of a program are stored, wherein the instructions, when executed by a processor, cause the processor to perform the method according to claim 1.

* * * * *